United States Patent [19]

Glascock et al.

[11] Patent Number: 5,660,808
[45] Date of Patent: Aug. 26, 1997

[54] SALT COMPATIBLE SODIUM TRIPOLYPHOSPHATE

[75] Inventors: Joan K. Glascock, St. Louis; Louis A. Highfill, Washington, both of Mo.

[73] Assignee: Monsanto Company, St. Louis, Mo.

[21] Appl. No.: 490,264

[22] Filed: Jun. 14, 1995

[51] Int. Cl.$^6$ .................................................. C01B 25/41
[52] U.S. Cl. .......................................... 423/315; 423/305
[58] Field of Search ...................................... 423/315, 305

[56] References Cited

U.S. PATENT DOCUMENTS

| | | | |
|---|---|---|---|
| 2,898,189 | 8/1959 | Rodis et al. | 423/315 |
| 3,338,671 | 8/1967 | Marshall et al. | 423/315 |
| 4,362,641 | 12/1982 | Peterson | 423/315 |
| 4,394,396 | 7/1983 | Shimp et al. | 426/332 |
| 4,536,377 | 8/1985 | Shimp | 423/315 |
| 4,671,949 | 6/1987 | Bourgeois et al. | 423/315 |
| 4,790,983 | 12/1988 | Saran | 423/315 |
| 4,798,712 | 1/1989 | Peterson | 423/315 |
| 4,857,287 | 8/1989 | Dick et al. | 423/315 |
| 4,942,047 | 7/1990 | Buckholz et al. | 426/302 |
| 4,948,621 | 8/1990 | Schwartz | 426/652 |
| 5,004,589 | 4/1991 | Cadwallader et al. | 423/315 |
| 5,164,213 | 11/1992 | Bonkowski | 426/281 |
| 5,294,424 | 3/1994 | Highfill et al. | 423/315 |

FOREIGN PATENT DOCUMENTS

| | | | |
|---|---|---|---|
| 19198 | 2/1977 | Japan | 423/315 |
| 723245 | 2/1955 | United Kingdom | 423/315 |
| 777253 | 6/1957 | United Kingdom | 423/315 |

*Primary Examiner*—Wayne Langel
*Attorney, Agent, or Firm*—Fitzpatrick, Cella, Harper & Scinto

[57] ABSTRACT

There is disclosed a process for preparing sodium tripolyphosphate which will dissolve readily in an aqueous solution also containing sodium chloride and various spices and flavorings useful in the treatment of food products such as fresh red meats, poultry and fish. The sodium tripolyphosphate of this invention is prepared from a dry blend of disodium phosphate and monosodium phosphate in a weight ratio in the range of from about 2.35 to about 2.45. The dry blend is calcined so as to produce a product having from 85% to 90% sodium tripolyphosphate, of which from about 90% to 100%, by weight, is phase II product. The product also contains about 10% to about 15% sodium pyrophosphate.

4 Claims, No Drawings

SALT COMPATIBLE SODIUM TRIPOLYPHOSPHATE

This invention relates to the process for preparing sodium tripolyphosphate compositions having enhanced solubility in aqueous salt (sodium chloride) solutions. In addition, this invention relates to a composition containing mostly Type II sodium tripolyphosphate and from about 10% to about 15%, by weight, sodium pyrophosphate.

BACKGROUND OF THE INVENTION

The use of sodium tripolyphosphate in food enhancement processes and compositions is well documented in the literature. Moisture preservation in meats and seafood is a typical benefit in the use of sodium tripolyphosphate. It is desirable to include sodium tripolyphosphate in such food treatment compositions as brine solutions containing sodium chloride(salt) as well as in blends incorporating spices, flavorings and salt. The sodium tripolyphosphate usually prepared has been found to provide a rate of solution in such compositions containing salt or spices/flavoring/salt such that it slows preparation or production time and can even result in solutions having a cloudy appearance indicating some suspended insolubles. In addition sediment may form which would interfere with meat treatment processes.

Typical examples of food processing wherein sodium tripolyphosphate is employed can be found in the patent literature. For example, U.S. Pat. No. 4,394,396 to Shimp et al. discloses a process for treating shrimp that results in their having desirable moisture and natural appearance. The treating solution contains sodium tripolyphosphate and sodium acid pyrophosphate salts in water wherein the salts have a weight ratio of 80:20 to 60:40 with an optional portion of "ordinary" salt up to about 7%. The patent indicates that if only sodium tripolyphosphate is employed there is provided an adequate degree of water retention but that the appearance of the treated shrimp is undesirable.

A typical brine solution is described in U.S. Pat. No. 5,164,213 to Bonkowski. The inventive brine mix described in that patent enables the user to add the ingredients of the brine in one step rather than the prior practice of adding ingredients stepwise with large amounts of water to obtain hydration or solution. The brine mix also contained various proteins, carbohydrates, hydrocolloids, salt, flavoring and phosphates into a single unit.

A typical marinade is described in U.S. Pat. No. 4,942,047 to Buckholz, Jr., et al. The percent of salt (including phosphate), flavor composition and/or flavor precursor composition in water for the marinade composition is said to vary from about 20% up to about 40% by weight with a preferred range of from about 25% to about 35% by weight of the liquid marinade composition.

The industry has searched for suitable phosphate salts which would dissolve reasonably well into brine and other salt solutions. One such example is found in U.S. Pat. No. 4,948,621 to Schwartz which attempts to provide inorganic polyphosphates which will form a clear, stable solution suitable for injection into meat products. The composition comprises sodium tripolyphosphate and a long chain glassy phosphate in sufficient quantities to provide 92 to 85 parts by weight sodium tripolyphosphate and 8 to 15 parts by weight of long-chain glassy phosphate. The procedure described therein provided for first dissolving the polyphosphates in water and then adding salt and other ingredients to the phosphate salt solution. There is desired in some instances a mixture of sodium tripolyphosphate and sodium pyrophosphate for use in preparing both food and detergent use. The ability to provide various mixtures of sodium tripolyphosphate and other polyphosphate salts by varying the Na/P ratio in the mixture being calcined is explained in U.S. Pat. No. 4,671,949 to Bourgeois, et al. which is incorporated herein by reference. The patent indicates the Na/P ratio of 1.667±0.01 provides a particularly pure sodium tripolyphosphate which lacks caking tendency upon solution in water. A particular process involving regulation of the calcining process is also discloses to achieve a more desirable sodium tripolyphosphate.

Mixtures of orthophosphates, particularly mono and disodium phosphates, dried to a granular solid, are employed to prepare various polyphosphate including sodium tripolyphosphate, sodium pyrophosphates and sodium metaphosphate. Blends of these polyphosphates can be prepared by mixing them or, more conveniently, they are co-produced in proportion. U.S. Pat. No. 4,798,712 to Peterson described forming a mixture of polyphosphate particles by varying the amount of alkali metal to phosphorus mole ratio in the range of from 5:3 to 6:3, flash-drying the solution and then calcining to produce a polyphosphate mixture. According to this patent, the process provides a polyphosphate mixture containing from about 75% to about 85% by weight sodium pyrophosphate and from about 15% to about 25% by weight of sodium tripolyphosphate by calcining dried orthophosphates at a temperature in the range of from about 350° to about 550° C.

Food grade sodium tripolyphosphate has varying rates of dissolution in aqueous mixtures and has a particular problem involving cake formation depending upon the nature of the sodium tripolyphosphate. The above noted patents, particularly U.S. Pat. No. 4,671,949 discloses that if sodium tripolyphosphate is dissolved in a medium which is not agitated or inadequately agitated, there is typically produced lumps which are difficult to dissolve or result in caking or hardening. Also, hydrated phase II sodium tripolyphosphate will result in virtually instantaneous total caking or hardening, whereas hydrated phase I sodium tripolyphosphate does not result in any caking or hardening. The patent claims a sodium tripolyphosphate product which contains from 15% to 60% phase I and a carefully controlled Na/P ration of 1.667±0.01. Such a product is stated to not exhibit solidification or caking in a quiescent solvent medium. The above noted patent U.S. Pat. No. 4,948,621 deals with the solution problem of sodium tripolyphosphate by incorporating from 8 to 15 parts by weight of a glassy phosphate into admixture with the sodium tripolyphosphate. In above note U.S. Pat. No. 4,394,396, a blend of sodium tripolyphosphate with sodium acid pyrophosphate in water was employed to provide a treatment for shrimp which would provide good water retention while at the same time preserve good food appearance of the cooked shrimp. No mention was made in the patent regarding solution rates.

There is needed a sodium tripolyphosphate which can be readily dissolved in water which also contains dissolved materials including salt, sugar, spices and flavorings. While mixtures of sodium tripolyphosphate with other polyphosphates have been known in the art, there are limitations on the amount which can be included with sodium tripolyphosphate and marketed as such in the food phosphate business. Food grade sodium tripolyphosphate must contain at least 85% by weight sodium tripolyphosphate. It is inconvenient to blend sodium tripolyphosphate with other products to achieve an acceptable mixture for the purpose of achieving salt compatibility in solution. It is therefore desirable to produce sodium tripolyphosphate in a process providing a mixture of phosphates which can be sold in the food industry under the sodium tripolyphosphate label but still providing rapid solution rates in salt or brine mixtures or with blends of spices or other flavorings including salt. Such a mixture would be considered a salt compatible sodium tripolyphosphate.

SUMMARY OF THE INVENTION

In accordance with this invention there is provided a salt compatible product capable of dissolving readily in an aqueous solution also containing sodium chloride which is a mixture comprising from 85% to 90% by weight sodium tripolyphosphate, at least 90% of said sodium tripolyphosphate being phase II product, and from about 10% to about 15% by weight sodium pyrophosphate.

It has been discovered that the composition of this invention, to produce a clear aqueous salt solution, must be substantially free of potassium. To be considered substantially free of potassium means that the composition contains less than about 500 ppm potassium. Should the potassium level rise to high in the composition the solution in the presence of sodium chloride will not be clear. A haze develops upon solution which does not clear in a reasonable amount of time indicating some insolubles are present.

The sodium tripolyphosphate of this invention is produced by forming in aqueous solution a mixture of disodium phosphate and monosodium phosphate in a ratio in the range of 2.35–2.45 and then drying the mixture. This mixture is then calcined at an inlet temperature in the range of from 900° C. to about 1100° C. with an outlet temperature in the range of from about 360° C. to about 390° C.

DETAILED DESCRIPTION OF THE INVENTION

The salt compatible sodium tripolyphosphate of this invention is prepared by first forming a solution of di- and monosodium phosphates in a ratio in the range of 2.35–2.45 which produces a mixture of phosphates containing the desired amount of sodium pyrophosphate and at least about 85% sodium tripolyphosphate upon drying and calcining. The specific gravity of the solution of di- and monosodium phosphate is typically in the range of from about 1.54 to 1.56. Typically the sodium phosphate solution is dried in stages so as to avoid processing problems by first drying on a drum dryer and then completing the drying process in a rotary drum dryer. Employing such a high ratio of disodium phosphate to monosodium phosphate virtually assures the elimination of production of any metaphosphate which would not be soluble in a salt solution. The dried mixture of di- and monosodium phosphates are calcined in conventional equipment. However, it has been found that an inlet temperature in the range of from about 900° C. to about 1100° C. is essential to the production of salt compatible sodium tripolyphosphate. An outlet temperature of about 360° C. is typical of the process of this invention although outlet temperatures in the range of from about 300° C. to about 390° C. are acceptable.

Surprisingly, it has been discovered that the presence of potassium ions in the process mixtures to prepare the composition of this invention causes the product to exhibit incomplete solution of the sodium tripolyphosphate and pyrophosphate, even when present at relatively low levels. Therefore, in accordance with this invention, care must be taken to prevent contamination of the sodium tripolyphosphate product with potassium. Accordingly, the salt compatible sodium tripolyphosphate of this invention is substantially free of potassium. Generally, the level of contamination is held to a minimum. In the context of this invention with respect to potassium, a potassium level in the feed liquor solution in the range of from about 500 to about 1000 ppm or less can occur without substantial loss of solubility of the final product. It is known from U.S. Pat. Nos. 3,431,069 and 3,397,947 to Hudson et al. and Shaver, respectively, that it is useful to add a small amount of potassium to the orthophosphate to be calcined to either assure a high amount of phase 1 material or to avoid formation of insoluble sodium phosphates during the calcining operation. Contamination is typically avoided by providing clean equipment when running the process of this invention in equipment common with other process which my have incorporated potassium in such other processes.

The sodium tripolyphosphate of this invention can be employed in either the granular or powder form, although most typically in the powder form. Generally, the density of the sodium tripolyphosphate of this invention in the granular form before milling is in the range of from about 0.65 to about 0.8 g/cc.

The sodium tripolyphosphate product of this invention has a temperature rise (TR) of from less than 10° C. and typically in the range of from 7° C. to 9° C. Typically, there is virtually no phase I product in the sodium tripolyphosphate of this invention. The pH of a 1% solution of the sodium tripolyphosphate of this invention at 25° C. is in the range of from about 9.7 to about 10.1.

DESCRIPTION OF THE PREFERRED EMBODIMENTS

EXAMPLE I

A pass/fail test was devised to determine the ability of the sodium tripolyphosphate product of this invention to dissolve in water in the presence of salt (reagent grade sodium chloride). A dry mixture was prepared containing 18.5 gm of either powder or granular sodium tripolyphosphate and 24.5 gm of sodium chloride. In a beaker equipped with a mechanical stirring means there was placed 325 gm of deionized water at room temperature (23°–25° C.). The dry mixture was then poured into the water which was being stirred at 800 rpm. The dry mixture was added to the water in at least 15 seconds and stirring continued for a total of 3 minutes from the start of addition of the dry mix. The resulting solution was then observed for clarity and solids (absence of clumping). The results of the testing appear in Table I below wherein STP is an abbreviation for sodium tripolyphosphate.

TABLE I

| Polyphosphate | TR | Pass (+) Fail (−) | Comment |
| --- | --- | --- | --- |
| STP 118* | 7 | − | Small amount of undissolved STP |
| STP 088 | 23 | − | Large amount of undissolved STP |
| STP 110 | 10–20 | − | Large amount of undissolved STP |
| STP (1) | 7.0 | + | Clear solution |
| STP (2) | 7.5 | + | " |
| STP (3) | 7.4 | + | " |
| 067 | 10–20 | − | Undissolved STP |
| 185 | 6–8 | − | " |
| 195 | 15–20 | − | " |
| 120 | 6–8 | − | " |

*Numerical values are Monsanto Company commercial grade designation.

The above identified samples of STP (1)–(3) were analyzed for the various phosphates species and found to contain the following compounds noted in Table II below.

All of the commercial grades of sodium tripolyphosphate assay greater than 90% of said tripolyphosphate.

TABLE II

|             | STP (1) | STP (2) | STP (3) |
|-------------|---------|---------|---------|
| trimeta-    | 0.44    | <0.1    | 0.2     |
| tripoly-    | 85.43   | 87.4    | 88.6    |
| sodium pyro-| 12.92   | 12.5    | 10.8    |
| ortho-      | 1.20    | 0.1     | 0.33    |
| pH- 1% soln.| 10.0    | 10.0    | 10.1    |

EXAMPLE 2

The solubility test of Example 1 was repeated except that 200 ml of sea water from the Gulf of Alaska was substituted for deionized water and granular sodium tripolyphosphate of this invention was employed instead of powder. This test determined a useful concentration of sodium tripolyphosphate of this invention in sea water which may be employed aboard fishing vessels to treat freshly caught fish and shellfish. Three different amounts of the sodium tripolyphosphate were employed so as to form solution concentrations of 3, 5 and 10 percent by weight. The time in minutes required for a clear solution to form was noted. The results of the test appear in the Table III below.

TABLE III

| Concentration | Time | Appearance |
|---------------|------|------------|
| 3%            | 30   | small ppt. formed in 1 hr. |
| 5%            | 4    | Small amount of ppt. overnight |
| 10%           | 2    | Stable, clear soln. overnight |

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for preparing a salt compatible sodium tripolyphosphate which comprises forming an aqueous solution of di- and monosodium orthophosphate having a ratio of di- to monosodium phosphate in the range of from 2.35 to 2.45, respectively, drying the solution to form a dried mixture and feeding the dried mixture to a calciner having an inlet gas temperature in the range of from about 900° C. to about 1100° C. and an outlet temperature in the range of from about 300° C. to about 390° C. whereby a mixture is formed comprising from 85% to 90% by weight sodium tripolyphosphate and from 10% to 15% by weight sodium pyrophosphate said composition being substantially free of potassium.

2. The process of claim 1 further including the step of milling the sodium trilpolyphosphate to a powder form.

3. The process of claim 1 wherein the specific gravity of said aqueous solution/is in the range of from about 1.54 to about 1.56.

4. A salt compatible sodium tripolphoshate composition comprising a mixture of from 88% to 90% by weight sodium tripolyphosphate and from 10% to 12% by weight sodium pyrophosphate, said composition being substantially free of potassium, said composition having been prepared by the process of forming an aqueous solution of di- and monosodium orthophosphate having a ratio of di- to monosodium phosphate in the range of from 2.35 to 2.45, respectively, drying the solution to form a dried mixture and feeding the dried mixture to a calciner having an inlet gas temperature in the range of from about 900° C. to about 1100° C. and an outlet temperature in the range of from about 300° C. to about 390° C.

* * * * *

UNITED STATES PATENT AND TRADEMARK OFFICE
CERTIFICATE OF CORRECTION

PATENT NO. : 5,660,808

DATED : August 26, 1997

INVENTOR(S): JOAN K. GLASCOCK ET AL.

It is certified that error appears in the above-identified patent and that said Letters Patent is hereby corrected as shown below:

COLUMN 1

Line 24, "addition" should read --addition,--.

COLUMN 2

Line 9, "discloses" should read --disclosed--; and
    Line 48, "note" should read --noted--.

COLUMN 3

Line 20, "to" should read --too--.

COLUMN 4

Line 7, "phase 1" should read --phase I--.

COLUMN 5

Line 26, "the" should be deleted.

UNITED STATES PATENT AND TRADEMARK OFFICE
CERTIFICATE OF CORRECTION

PATENT NO. : 5,660,808

DATED : August 26, 1997

INVENTOR(S): JOAN K. GLASCOCK ET AL.

It is certified that error appears in the above-identified patent and that said Letters Patent is hereby corrected as shown below:

<u>COLUMN 6</u>

```
Line 20, "pyrophosphate" should read --pyrophosphate,--;
Line 22, "claim 1" should read --claim 1,--;
Line 24, "claim 1" should read --claim 1,--;
Line 25, "solution/is" should read --solution is --; and
Line 27, "tripolphoshate" should read
         --tripolyphosphate--.
```

Signed and Sealed this

Fifth Day of May, 1998

Attest:

BRUCE LEHMAN

Attesting Officer

Commissioner of Patents and Trademarks